United States Patent [19]

Pope

[11] 4,040,069
[45] Aug. 2, 1977

[54] FIXED TIME DELAY CIRCUIT FOR QUENCH STROBE

[75] Inventor: William R. Pope, Cambridge, Mass.

[73] Assignee: Polaroid Corporation, Cambridge, Mass.

[21] Appl. No.: 674,937

[22] Filed: Apr. 8, 1976

[51] Int. Cl.² ............................ G03B 7/14; G03B 7/16
[52] U.S. Cl. ......................................... 354/27; 354/32; 354/33; 354/34; 354/139; 354/145; 354/149; 307/293
[58] Field of Search .................... 354/27, 32, 33, 34, 354/60 F, 126, 127, 128, 129, 137, 139, 145, 149; 328/77, 78; 307/293

[56] References Cited
U.S. PATENT DOCUMENTS

| | | | |
|---|---|---|---|
| 3,756,132 | 9/1973 | Ogawa | 354/32 |
| 3,774,072 | 11/1973 | Ogawa | 354/32 |
| 3,858,227 | 12/1974 | Ellin et al. | 354/145 |

Primary Examiner—Russell E. Adams
Attorney, Agent, or Firm—Edward S. Roman

[57] ABSTRACT

A time delay circuit is provided to control a quench strobe so that the quench strobe may be utilized in conjunction with a camera of the type having an automatic exposure control system for controlling a pair of scanning shutter blade elements having respective primary apertures therethrough for collectively defining a gradually varying effective aperture size as a function of the position of the blade elements together with corresponding photocell sweep secondary apertures therethrough for movement in correspondence with the primary apertures to define a small secondary effective aperture for admitting the passage of scene light to a photocell. The time delay circuit is made responsive to the shutter blade closing command signal from the camera control system to provide a quench signal to the strobe only after a predetermined time delay thereby compensating for the fact that the command signal anticipates for the additional light admitted by the shutter blade elements during the time required for the shutter blade elements to close when an ordinary flash lamp is utilized.

17 Claims, 7 Drawing Figures

FIXED TIME DELAY CIRCUIT FOR QUENCH STROBE

BACKGROUND OF THE INVENTION

1 Field of the Invention

This invention relates generally to an artificial illumination control system for photographic apparatus and, more particularly, to an artificial illumination control system for use with either ordinary flash lamps or other sources of artificial illumination such as a quench strobe.

2. Description of the Prior Art

Electronic photographic strobe devices of the type in which the flashlight produced by the flashtube of the device is automatically terminated after a predetermined quantity of light has been received from the scene being photographed by a light responsive control portion of the device are well known in the art. Such strobes are commonly referred to an quench strobes. In addition to having an independent light responsive control circuit in the strobe, it is also well known to utilize the exposure control circuit associated with the actual camera apparatus to control the firing and quenching of a strobe unit as is more fully disclosed in U.S. Pat. No. 3,776,112 by Wilwerding issued 1973. Wilwerding discloses a circuit coupled to the light integrating exposure control circuit of a camera to effect the flash quenching of an electronic flash unit. Thus, it is well known to couple an electronically controlled shutter camera with a quenchable electronic strobe unit so that the strobe unit is quenched simultaneously with the command signal to return the shutter blade elements to their closed position.

Such an arrangement however would not be compatible with an exposure control system of the type described in a copending application U.S. patent (Ser. No.619,384) entitled "Exposure Control System with Fill-Flash Race Condition" by Edwin K. Shenk, filed Sept. 30, 1975. The aforementioned exposure control system is utilized in conjunction with a shutter blade arrangement of the so-called "Scanning Type" which embodies a pair of shutter blade elements each of which include a primary aperture therethrough to cooperatively define a gradually varying effective aperture size as a function of the position of the shutter blade elements. Each shutter blade element additionally includes a photocell sweep secondary aperture which apertures also cooperatively define a gradually varying effective secondary aperture in front of the exposure control photocell as a function of blade position. The photocell sweep's secondary apertures are generally configured to progessively open ahead of the primary apertures so that the exposure control circuit effects the closing of the shutter blade elements at a time prior to which the film is fully exposed. Prematurely signaling the shutter blade elements to close prior to the time required for a full exposure anticipates for the additional scene light which will impinge upon the film during the finite time required for the shutter blade elements to fully close. Thus, quenching the strobe solely as a function of the exposure control system command signal to initiate closing of the shutter blade elements as disclosed in U.S. Pat. No. 3,776,112, supra, will result in an under-exposure since the strobe is quenched instantaneously. Hence, it has been suggested in a copending application for U.S. patent [our case number 5500] entitled "Artificial Illumination Control System for Photographic Apparatus" by George Whiteside, and Bruce Johnson filed concurrently herewith, that time delay means be utilized in conjunction with a quench strobe.

Hence it is a primary object of this invention to provide a specific embodiment for a time delay circuit which may be utilized in conjunction with a strobe in the manner described in the copending application for U.S. patent [our case number 5500] supra.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

This invention relates to a time delay circuit for use with both a photographic camera of the type having means for providing at least two control signals in sequence during the course of a photographic interval and a lighting apparatus of the type having a source of artificial illumination and means responsive to the first of the two control signals from the camera for initiating the energization of the source of artificial illumination to effect the firing thereof. The lighting apparatus also includes means responsive to a select signal for initiating the deenergization of the source of artificial illumination. The time delay circuit includes means for connecting to a source of electrical energy together with means for effecting an electrical connection from the time delay circuit to the camera as well as means for effecting an electrical connection from the time delay circuit to the lighting apparatus. The time delay circuit also includes circuit means energizable by the source of electrical energy, and responsive to the second of the two control signals from the camera for providing the select signal subsequent to the expiration of a predetermined time delay after receipt of the second of the two control signals from the camera. The circuit means includes: a first timing capacitor, first switch means for establishing a first effective electrical short across the timing capacitor prior to the first of the two control signals from the camera, and responsive to the first of the two control signals from the camera for removing the first electrical short across the timing capacitor, second switch means for establishing a second effective electrical short across the timing capacitor substantially simultaneous with the removal of the first electrical short and responsive to the second of the two control signals from the camera for removing the second effective electrical short across the timing capacitor so as to permit the timing capacitor to charge, and means responsive to the charge on the timing capacitor reaching a predetermined value at the expiration of the predetermined time delay for providing the select signal.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein;

DESCRIPTION OF THE PREFERRED EMBODIMENT

Figure 1:
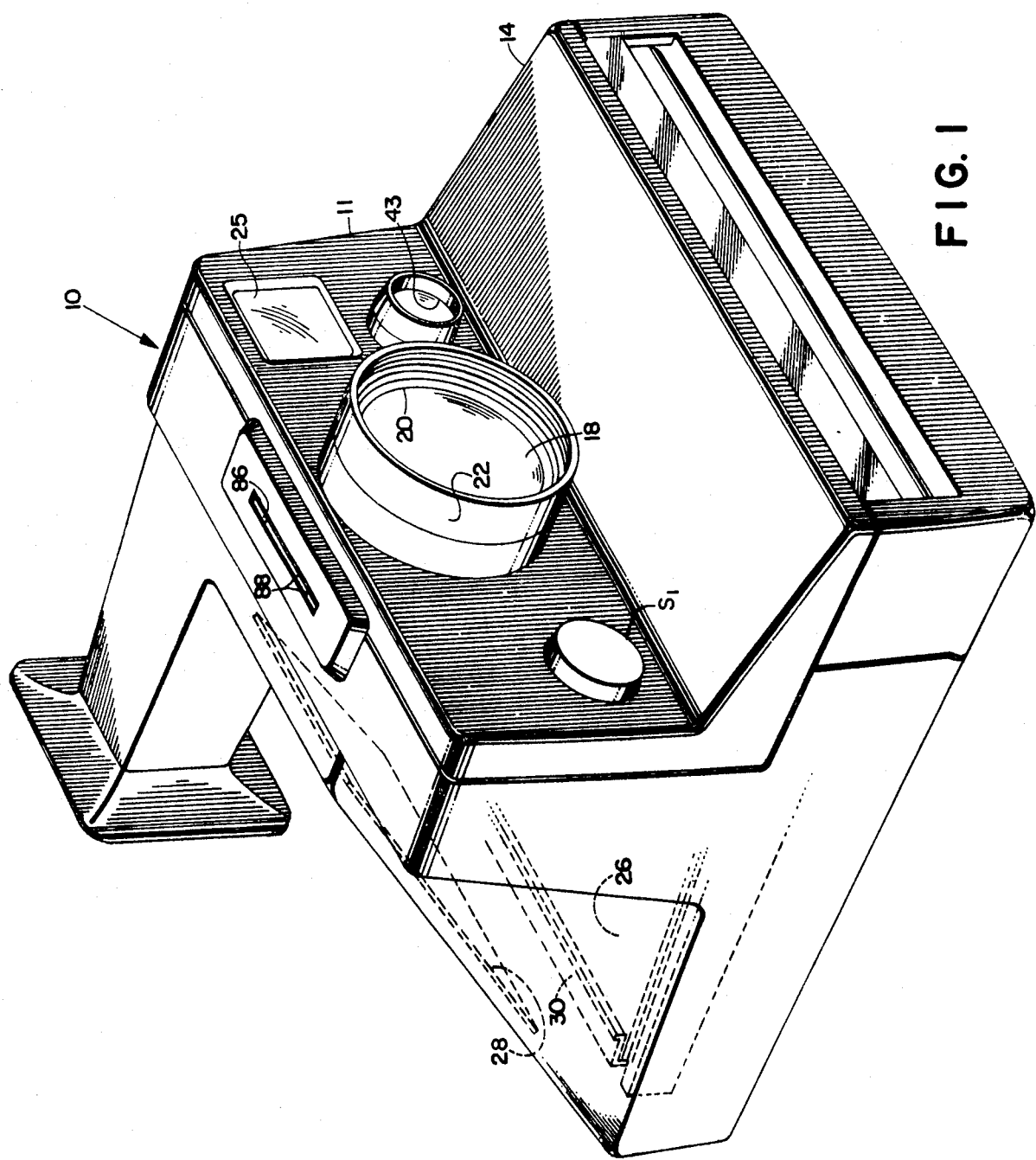
FIG. 1 is a perspective view of a photographic camera apparatus embodying an artificial illumination control system.
Figure 2:
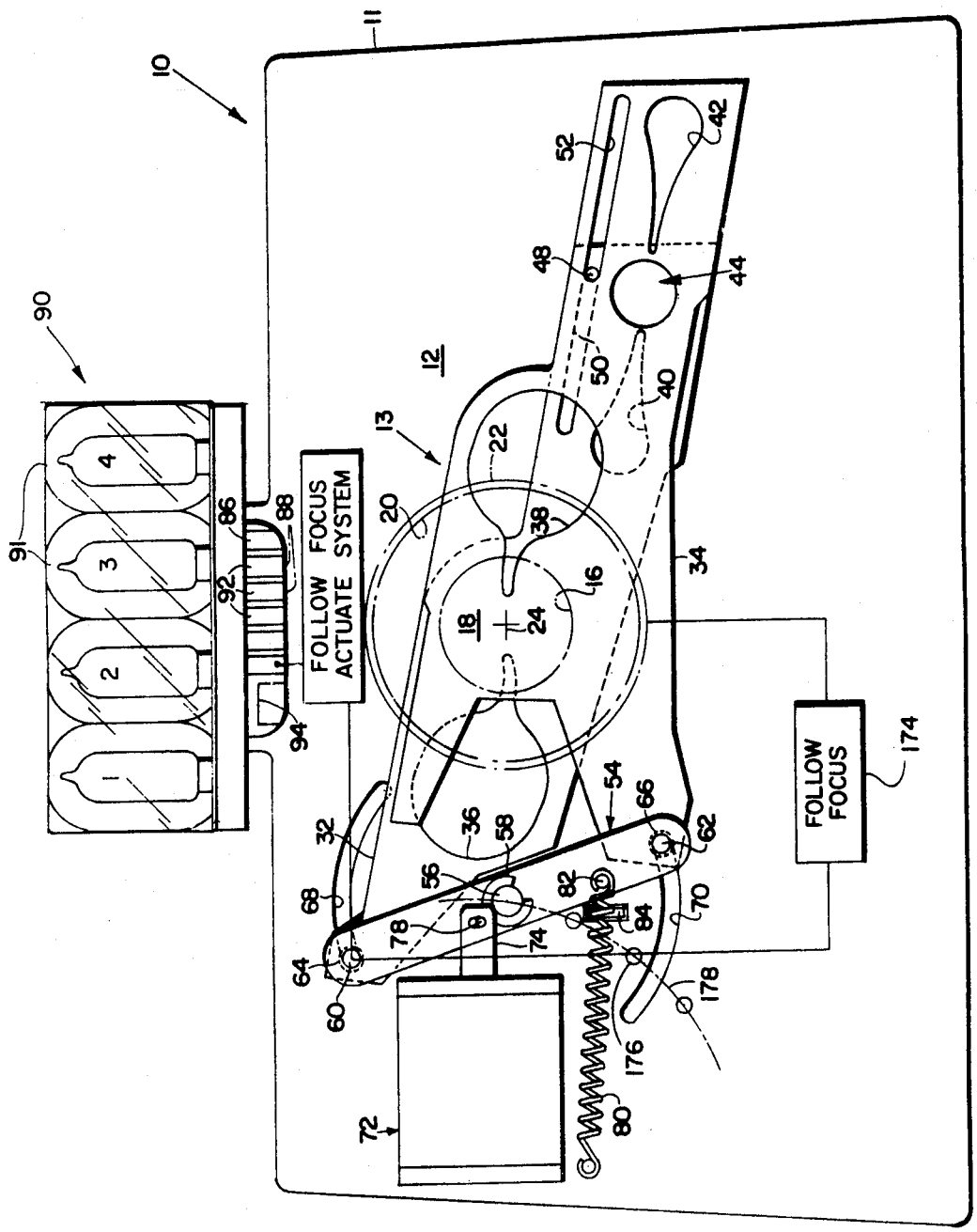
FIG. 2 is a front cross-sectional view of the camera of FIG. 1, showing a portion of a typical exposure control system.

Referring now to FIGS. 1 and 2, it can be seen that the artificial illumination control system of this invention may be associated with a photographic camera apparatus 10 contained within a housing 11. A baseblock casting 12 is fixedly stationed with the housing 11 and selectively machined to support the various components of an exposure mechanism shown generally at 13. Surrounding the front and top of the baseblock casting 12, there is provided a cover section 14 which includes at least one opening through which extends a manually adjustable focus bezel 22. Centrally disposed within the base-block casting 12, there is provided a light entering exposure opening 16 which defines the maximum available exposure aperture for the system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the front cover 14 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing of image carrying rays through the light entering exposure opening 16 to a rearwardly positioned film plan 26 by way of a reflecting mirror 28 all of which are stationed within a suitable light-tight film exposure chamber 30 within the housing 11.

Intermediate the objective lens 18 and light entering exposure opening 16, there are supported two overlapping shutter blade elements 32 and 34 which will be subsequently described in greater detail herein. Extending from the front cover 14 there is provided a photographic cycle initiating button $S_1$, the depression of which commences the exposure interval by ultimately effecting the release of the shutter blade elements 32 and 34. In addition, there is provided a viewfinder shown generally at 25 which enables a photographer to properly frame the desired scene to the photographed.

A pair of scene light admitting primary apertures 36 and 38 are provided respectively in the blade elements 32 and 34 to collectively define a progressive variation from effective aperture openings in accordance with simultaneous longitudinal lateral displacement of one blade element with respect to the other blade element in a manner as is fully described in a U.S. patent application Ser. No. 485,128 entitled "Camera With Pivoting Blades" by George D. Whiteside, filed July 2, 1974, and assigned in common herewith. The apertures 35 and 38 are selectively shaped so as to overlap the light entering exposure opening 16, thereby defining a gradually varying effective aperture size as a function of the position of the blade elements 32 and 34.

Figure 3:
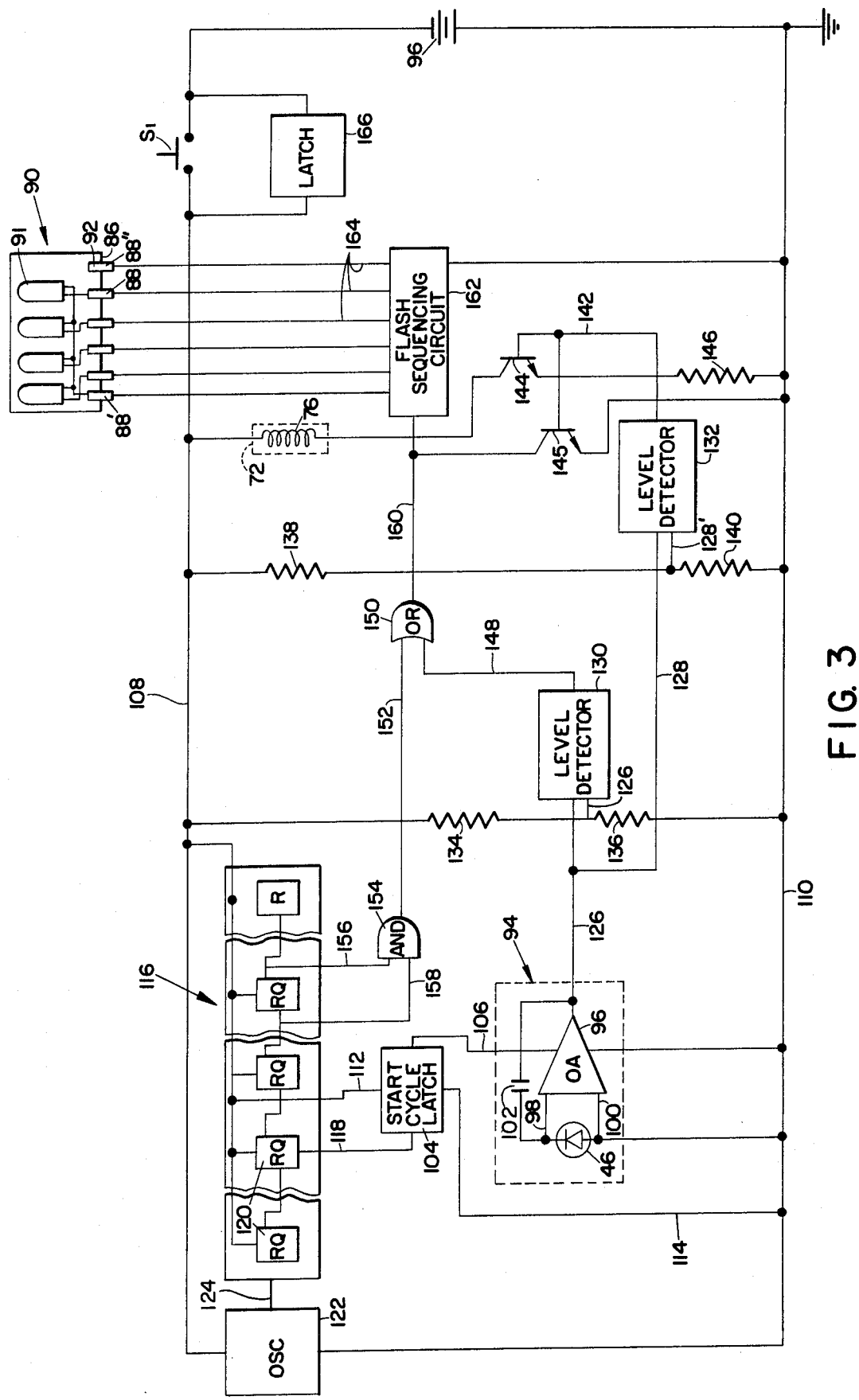
FIG. 3 is a schematic diagram showing a portion of a typical artificial illumination control system.

Each of the blades, 32 and 34, may additionally be configured to have corresponding photocell sweep secondary apertures shown respectively at 40 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of scene light transmitted through a second opening 43 in the cover 14 from the scene being photographed. Scene light admitted by the photocell secondary apertures 40 and 42 is thereafter directed to a light detecting station shown generally at 44. The light detecting station includes a photoresponsive element 46 which cooperates with light integrating and control circuitry as shown in FIG. 3 to terminate an exposure interval as a function of the amount of light received through the secondary effective aperture defined by the overlapping photocell sweep apertures 40 and 42.

Projecting from the baseblock casting 12 at a location spaced laterally apart from the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively include extended portions which pivotally connect to a walking beam 54. Beam 54, in turn, is disposed for rotation relative to the baseblock casting 12 by pivotal connection to a projecting pivot pin or stud 56 which may be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin members 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

A tractive electromagnetic device in the form of a solenoid 72 is employed to displace the shutter blades 32 and 34 with respect to each other and the casting 12. The solenoid 72 includes an internally disposed, cylindrical plunger unit 74 which retracts inwardly into the body of the solenoid upon energization of a solenoid coil or winding as shown at 76 in FIG. 3. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 suppports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 by a pin 82 while the stationary end of spring 80 is grounded with respect to the baseblock casting 12. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32, 34 from moving towards their maximum aperture opening under the urging of spring 80. However, as should be readily understood, the artificial illumination control system of this invention would be equally applicable to photographic systems where the blades 32 and 34 are spring biased in a normally closed position.

Continued energization of the solenoid 72 in order to maintain the shutter blade elements 32 and 34 in their closed positions may result in an undesirable drain in the camera apparatus power source which preferably is an electrical storage battery schematically shown in FIG. 3 at 96. Thus, a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. Pat. Ser. No. 554,777 entitled "Photographic Apparatus With Sequencing System" by B. K. Johnson, D. Van Allen, and G. D. Whiteside, filed Mar. 3, 1975 in common assignment herewith.

The photographic camera apparatus 10 is utilized in conjunction with a source of artificial illumination which preferably comprises a linear array of flash lamps as shown generally at 90. The linear flash array includes a plurality of individually spaced apart flash lamps 91 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photoflash Apparatus" By John Burgarella issued Sept. 11, 1973, and assigned in common herewith.

Under conditions of artificial illumination wherein the light has a relatively short duration such as from the individual flash lamps 91 of the linear array 90, the anticipated light level at the camera will depend upon the known characteristics of the flash lamps 91 and upon the distance from the subject being photographed to the light source. When the flash array 90 is mounted on the receiving socket 86, there may be actuated a follow focus system whereby the maximum effective aperture to which the shutter blade elements 32, 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 174) moves to appropriately displace a follow focus interceptor pin 176 about its locus of travel as shown by a phantom line 178. The follow focus interceptor pin 176 may be selectively actuated to intercept the edge of walking beam 54 in a well-known manner as is more fully described in a U.S. Pat. application Ser. No. 554,777 entitled "Exposure control System With Improved Follow Focus Capability For Photographic Apparatus", by George D. Whiteside, filed Feb. 28, 1975, and assigned in common herewith. Thus, as is readily apparent, the walking beam 54 may be intercepted by the follow focus interceptor pin 176 at various locations defining maximum effective apertures which correspond to the distance from which the subject is spaced from the camera apparatus 10.

Turning now to FIG. 3, there is shown a schematic diagram for the artificial illumination control circuitry including a scene light detecting and integrating circuit shown generally at 94. Circuit 94 includes the photoresponsive element 46 which may be a photovoltaic cell of the type generating an output signal in correspondence with the levels of scene light intensity incident thereon. The photoresponsive element 46 is orientated to evaluate the light levels of a scene coincident with the field of view of the lens system of the camera and operates in conjunction with the above described aperture scanning arrangement which alters the amount of scene light reaching the photoresponsive element 46 in synchronism and corresponding variation with the progressively changing aperture size. The photoresponsive element 46 is coupled with an amplifier stage 96 along input lines 98 and 100 wherein the amplifier 96 is of a type sometimes referred to in the art as an "operational amplifier" which may be of a differential variety preferably fabricated in practical miniaturized form. When considered ideally, the amplifier 96 has infinite gain and infinite input impedance and a zero output impedance.

By virtue of a feedback path comprising an integration capacitor 102 connected between the input line 98 and an output line 126 from the operational amplifier 96, the photoresponsive element 46 is permitted to operate into an apparent low-input impedance so as to function in a current mode, the current generated by the photoresponsive element 46 being limited substantially only by its own internal impedence. Thus, under such loading, the photoresponsive element 46 in conjunction with the operational amplifier 96 and capacitor 102 is capable of providing a desirable linear output corresponding to the time integration of scene light intensity incident to the photoresponsive element 46.

Any difference of potential supplied by the photoresponsive element 46 across input leads 98 and 100 causes a voltage to be produced at output line 126. The relatively low signal voltages at the input of amplifier 96 which are present with the relatively low signal current from the photoresponsive element 46 are acted upon by the correspondingly high gain characteristic of the amplifier. Thus, although the amplifier 96 has a very high input impedance, the photoresponsive element 46, when connected in the circuit described, experiences only a very low impedance. Therefore, the current output of the photoresponsive element 46 is directed into the feedback path.

The initial charging of the integration capacitor 102 is synchronized with shutter blade actuation by means of a start cycle latch circuit shown generally at 104 which provides an output actuation signal to the operational amplifier 96 by way of interconnecting line 106. The start cycle latch circuit 104 is connected to the supply line 108 and ground line 110 by way of lines 112 and 114 respectively and is made responsive to the output signal from a ripple counter 116 by way of an interconnecting line 118. The ripple counter 116, in turn, comprises a plurality of serially connected binary circuits 120, wach of which can provide an output control signal in a predetermined time sequence as is well known in the art. Binary circuits 120 may be ordinary "flip flops" interconnected in serial relation with respect to each other whereby the binary count rate is determined by an oscillator circuit 122 connected thereto by way of a line 124.

The output signal from the light detecting and integrating circuit 94 at line 126 is directed to a pair of level detector circuits 130 and 132 by way of interconnecting lines 126 and 128 respectively wherein level detector 130 controls the "fill flash" function to be subsequently described. Each level detector 130 and 132 may be of any conventional design such as a Schmitt Trigger. As is readily apparent, the steady state reference voltage to the level detector 130 is established by biasing means comprising a first resistor 134 connected between the supply line 108 and the input line 126' together with a second resistor 136 connected between the input line 126' and the ground line 110. In like manner, the steady-state reference voltage level to the detector 132 is established by biasing means comprising a third resistor 138 connected between the supply line 108 and the input 128' and a fourth resistor 140 connected between the input line 128' and the ground line 110.

The output signal from detector 132 is directed to the base of an NPN transistor 144 by way of an interconnecting line 142. The collector of transistor 144, in turn, is connected to the supply line 108 by way of the solenoid winding 76, while the emitter of transistor 144 is connected to the ground line 110. The output signal from the level detector circuit 130 is directed to an OR gate 150 by way of line 148. The output from the OR gate 150 in turn is directed by way of an interconnecting line 160 to a flash sequencing circuit 162 which will be more fully described in the following discussion. The flash sequencing circuit 162 operatively connects to the linear flash array 90 upon the insertion thereof into the flash array receiving socket 86. The operative connection is made possible by the plurality of spaced apart terminal pads or elements 88 in the receiving socket 86, which elements are electrically connected to the flash sequencing circuit 162 by way of lines 164 respectively. Thus, insertion of the linear flash array 90 within the receiving socket 86 operates to bring the terminal elements 92 into respective electrical connection with the terminal elements 88. The flash sequencing circuit 162 thereafter operates to sequentially ignite the individual flashlamps.

A second input signal to the OR gate 150 is derived from an AND gate 154 by way of an interconnecting line 152. The AND gate 154, in turn, receives an output signal from the ripple counter 116 by way of lines 156 and 158. As is now readily apparent, the output signal from the AND gate 154 is timed to occur at a predetermined interval subsequent to the actuation of the start cycle latch 104, which coincides to the initiation of the actual exposure interval period.

Figure 4:
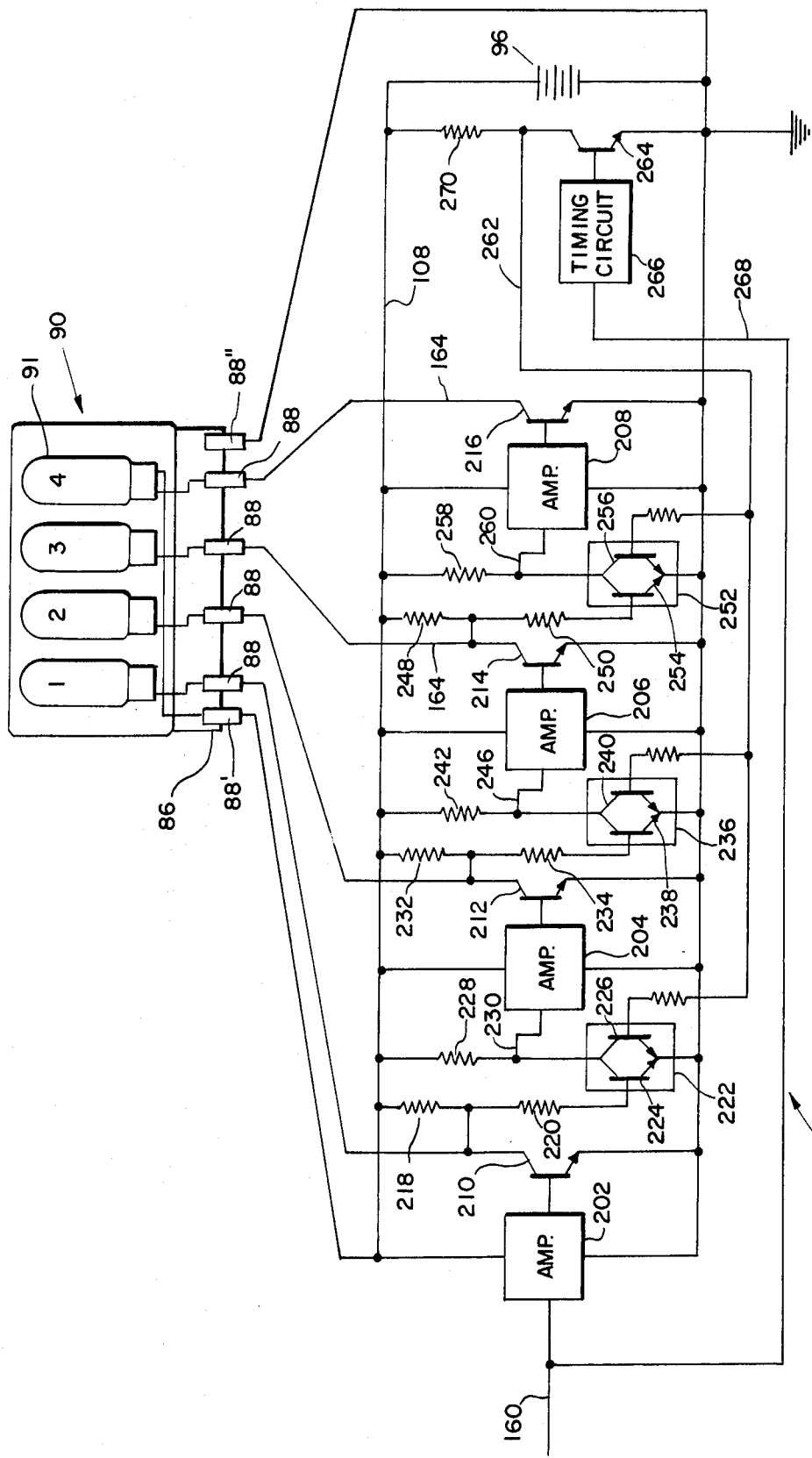
FIG. 4 is a schematic diagram showing, in greater detail, a portion of the artificial illumination control system of FIG. 3.

Referring now to FIG. 4 there is shown in detail the flash sequencing circuit 162, which comprises a plurality of amplifiers 202, 204, 206 and 208 arranged in serial relationship to respectively drive a plurality of NPN output transistors 210, 212, 214 and 216. The collector terminal of each output transistor, 210 through 216, respectively connects to an output terminal 88. The collector terminal of transistor 210 additionally connects to both the supply line 108 by way of an interconnecting resistor 218 and to a latching circuit, shown generally at 222, by way of another interconnecting resistor 220. The latching circuit 222 preferably comprises two NPN transistors, 224 and 226, connected in common grounded emitter mode. The collector terminals of transistors 224 and 226 are also in commmon connection, with respect to the input line 230 of amplifier 204.

In like manner, the collector terminal of output transistor 212 is connected to both the supply line 108 by way of an interconnecting resistor 232 and to the input line of a second latching network 236 by way of another interconnecting resistor 234. Latching network 236 also comprises two NPN transistors, 238 and 240, connected in common grounded emitter mode. The collector terminals of transistors 238 and 240 are also in common connection to both the supply line 108 by way of an interconnecting resistor 242 and to the input line 246 of amplifier 206. In like manner, the collector terminal of transistor 214 connects to both the supply line 108 by way of an interconnecting resistor 248 and to the input of a third latching network 252 by way of another interconnecting resistor 250. The latching network 252 comprises two NPN transistors, 254 and 256, connected in common grounded emitter mode. The collector terminals of transistors 254 and 256 are also in common connection with respect to both the supply line 108 by way of an interconnecting resistor 258 and to the input terminal of amplifier 208 by way of an input line 260.

The base terminals of transistors 226, 240 and 256 connect to the collector terminal of an NPN transistor 264 by way of a common line 262. The collector of transistor 264 in turn in connected to the supply line 108 by way of a resistor 270. Transistor 264 is controlled through a timing circuit 266, which in turn in controlled from the input line 160 by way of an interconnecting line 268.

Thus, as is now readily apparent, insertion of the linear flash array 90 into the flash array receiving socket 86 operates to bring one terminal from each flash lamp 91 into respective electrical contact with a terminal element 88 in the flash array receiving socket. The other terminal elements from the flash lamps 91 are in common electrical connection with respect to each other and are connected to the supply line 108 by way of terminal element 88'. Also, as should be readily apparent, although the flash sequencing circuit 162 is shown as having terminal elements sufficient to accommodate a linear flash array having four flash lamps 91, more or less terminal elements 88 may be included in the flash sequencing circuit 162 to accommodate respectively for more or less individual flash lamps 91 in the linear flash array 90.

Subsequent to the insertion of the linear flash array 90 within the flash array receiving socket 86, a low ambient light intensity photographic exposure interval may be commenced upon the depression of the photographic exposure interval initiating button $S_1$. As will become readily apparent, the operational sequence for the various embodiments of the exposure control system of this camera are described in relation to a photographic camera of the nonsingle lens reflex type, although the intended scope of the invention is by no means so limited and cameras of the well-known reflex type as described in U.S. Pat. No. 3,672,281 entitled "Reflex Camera" by E. H. Land may be equally suitable for incorporating the exposure control system of this invention. Thus, closure of switch $S_1$ operates to simultaneously move the latch 84 out of engagement with the edge of the walking beam 54 in a manner fully described in U.S. Patent Application, Ser. No. 554,777, supra, as well as to energize the exposure control circuitry of FIG. 3. Disengagement of the latch 84 from the edge of the walking beam 54 permits tension spring 80 to rotate the walking beam 54 in a clockwise direction as viewed in FIG. 2. In this manner, the shutter blade elements 32 and 34 are moved from an initial closed arrangement in directions which operate to progressively enlarged the effective aperture over the light entry exposure opening 16. As should be readily understood, in cameras of the single lens reflex type, the blade elements must first be closed, and thereafter move from this initial closed arrangement to define an exposure interval. The rotation of the walking beam 54 effects simultaneous linear and angular displacement of the shutter blade elements 32 and 34 about pivot pin 48, so that photocell sweep secondary apertures 40 and 42 simultaneously define a corresponding progressively enlarging effective aperture opening over the photoresponsive element 46.

As is readily apparent, a battery supply voltage across lines 108 and 110 will be maintained only as long as the operator maintains switch $S_1$ in its depressed state, which may be perfectly adequate for situations where the human reaction time in depressing and releasing the switch $S_1$ substantially exceeds the longest exposure time likely to be incurred. However, in situations where the normal exposure time is likely to exceed the human reaction time in depressing and releasing switch $S_1$, there may be provided a latch circuit, as shown generally at 166, in parallel connection with respect to the switch $S_1$, for maintaining continuous energization of the exposure control circuit even after the release of the switch $S_1$. A suitable automatic latch circuit is more fully described in U.S. Pat. No. 3,744,385 entitled "Control System for Photographic Apparatus", by Burgarella, et al. issued July 10, 1973 and assigned in common herewith.

Preferably, insertion of the linear flash array 90 within the flash receiving socket 86 also operates to actuate the follow focus mechansim 174 so as to move the interceptor pin 176 into the walking beam 54 locus of travel. As previously discussed, rotation of the focus bezel 22 to focus the objective lens 18 also operates to move the interceptor pin 176 along the phantom line 178. Thus, the maximum effective aperture to which the shutter blade elements 32 snd 34 may be progressively opened is limited by the point of interception of the pin 176 with the edge of the walking beam 54.

The photoresponsive element 46 provides an appropriate voltage response corresponding to the scene light intensity incident thereon, which voltage response is thereafter integrated by the operational amplifier 96 and feedback capacitor 102 to provide an output signal representative of the time integration of the scene light intensity incident to the photoresponsive element 46. Under conditions of low ambient scene light intensity, the output signal representative of the time integration of the scene light intensity incident to the photoresponsive element 46 will fail to reach the signal level required to trigger the level detector 132 prior to the time required for the shutter blade elements to reach their follow focus setting. Thus, after a sufficient time elapses, during which the scene light intensity remains inadequate to trigger the level detector 132, the ripple counter 116 then provides positive output signals at line 156 and 158 to switch the AND gate 154 and provide an output signal at line 152 to the OR gate 150. The OR gate 150, in turn, switches to provide a flash igniting signal to the flash sequencing circuit 162 by way of the interconnecting line 160.

Referring now to FIG. 4, it can be seen that a flash igniting signal is first applied to amplifier 202, which in turn drives transistor 210 into full conduction so as to effect the firing of the first flash lamp 91 in the linear flash array 90. The flash ingiting signal at line 160 additionally triggers a timing circuit 266 so as to turn on transistor 264 and thereby simultaneously turn off transistors 226, 240 and 256. In this manner, the latching networks 222, 236 and 252 are temporarily disabled to permit the energization of the first flash lamp 91. As the first flash lamp 91 is burned, its impedance increases so as to drive transistor 210 further into saturation and thereby start to turn transistor 224 off. However, prior to the turning off of transistor 224, which would ultimately turn on transistor 212 by way of amplifier 204, timing cicuit 226 operates to turn off transistor 264, in turn, turning on transistors 226, 240 and 256 of respective latching networks 222, 236 and 252. Thus, as is now readily apparent, simultaneously turning on the latching networks 222, 236 and 252 operates to inhibit any further firing of the flash lamps 91.

A subsequent reoccurrence of the flash igniting signal at line 160 in the course of another photographic exposure cycle will again operate to drive transistor 210 hard into saturation so as to turn off transistor 224 of latching network 222. Transistors 226, 240 and 256 of respective latching networks 222, 236 and 252 are again turned off in the aforementioned manner by way of transistor 264 and timing circuit 266. Thus with both transistors 224 and 226 of latching network 222 turned off, amplifier 204 is actuated to drive transistor 212 thereby firing the second flash lamp 91 in the linear flash array. Again, as is readily apparent, continued firing of the second flash lamp results in a substantial increase in its impedence so as to drive transistor 212 further into saturation thereby ultimately turning off transistor 238. However, prior to this occurrence, transistor 240 is again turned on by transistor 264 and timing circuit 266 thereby latching amplifier 206 off. In this manner, each flash lamp 91 may be sequentially fired until the last flash lamp is fired by way of transistor 216.

As should now be readily apparent, the requisite output signals at lines 156 and 158 to fire a flash lamp 91, occur at a predetermined time period, subsequent to the initiation of an exposure interval. The predetermined time period is selected to be at least as long as the longest time required for the shutter blade elements 32 and 34 to reach their maximum aperture defining position when the taking lens 18 is focused to infinity. As should also now be readily apparent, focusing lens 18 at infinity operates to move the follow focus interceptor pin 176 to the largest effective aperture defining position to which the shutter blade elements 32 and 34 can possibly move. In this manner, the shutter blade elements 32 and 34 will always be at rest at their maximum aperture defining position upon energization of the flash array 90.

Subsequent to the energization of an individual flash lamp 91, there will occur a rapid rise in the time integration of the scene light intensity incident to the photoresponsive element 46. The steady state input voltage reference level to the detector circuit 132 is biased by the resistors 138 and 140 to establish the predetermined value to which the input signal at line 126 must increase in order to trigger the level detector 132. Thus, the light intensity is integrated until reaching a predetermined value corresponding to a select film exposure, at which point the level detector circuit 132 is triggered into an abrupt change of state at the output line 142, from a generally low value which is insufficient to maintain the transistor 144 in conduction, to a substantially higher current level of sufficient value to turn on the transistor 144 and thus establish a current flow from collector to emitter through the transistor 144. Turning on the transistor 144, in turn, operates to energize the solenoid winding 76 to retract the plunger unit 74 so as to rotate the walking beam 54 in a counter-clockwise direction, as viewed from FIG. 2, against the biasing force of tension spring 80, thereby moving the shutter blade elements into their closed position. A second transistor 145 is also turned on by the level detector 132 simultaneously with transistor 144 so as to effectively ground the flash igniting signal at line 160 for reasons which will become apparent from the following discussion. After the walking beam 54 is rotated to its full counter-clockwise position, the latch 84 may be automatically moved into intercepting relation with the edge of the walking beam so as to permit the deenergization of the solenoid in a manner as is more fully described in U.S. patent application Ser. No. 554,777 supra. In this manner the exposure interval is terminated.

In situations where the ambient light intensity levels are relatively high, but portions of the photographic subject are relatively dark, the photographic apparatus is capable of operating in a so-called "fill-in flash" mode of operation to provide supplementary illumination in a manner as is more fully described in a copending Application for U.S. patent application Ser. No. 619,384. entitled "Exposure Control System With Fill Flash Race Condition" by Edwin K. Shenk, filed Sept. 30, 1975. However, under conditions of increased levels of ambient light intensity, the film may receive its correct exposure prior to the aforementioned predetermined time period, in which case the level detector 132 will energize the solenoid winding 76 and retract the solenoid plunger 74 prior to the time in which a flash lamp 91 would otherwise be energized. Thus, alternate means are provided for triggering energization of a flash lamp 91 under conditions of relatively high ambient light intensity where the exposure interval would likely be terminated prior to the predetermined delay period.

The "fill-in flash" mode of operation is commenced in the previously described manner upon the depression of the photographic exposure interval initiating button $S_1$, which operates to simultaneously move the latch 84 out of engagement with the walking beam 54 as well as to energize the control circuit of FIG. 3. Disengagement of the latch 84 from the edge of the walking beam 54 permits the tension in spring 80 to rotate the walking beam 54 in a clockwise direction as viewed in FIG. 2 so as to initiate the exposure interval and permit the shutter blade elements 32 and 34 to approach their maximum aperture defining position as limited by the follow focus interceptor pin 176. As a result of the increased ambient scene light intensity, the time integration of the scene light intensity incident to the photoresponsive element 46 proceeds substantially more rapidly than that for the previously discussed lower ambient scene light intensity situation. The steady state reference voltage signal level to the detector circuit 132 is biased by the resistors 138 and 140 to be above the predetermined value required to trigger the "fill-in flash" level detector 130. As is readily apparent, the predetermined trigger value for a detector 130 is selected to be below the predetermined trigger value for the level detector 132 and preferably is only approximately 30% of the predetermined trigger value required to switch detector 132. The output voltage signal from the light detecting and integrating circuit 94 at line 126 will now operate to trigger the level detector 130 and thereby change the output signal therefrom at line 148, from a generally low value, to a substantially higher current level of sufficient value to switch the OR gate 150. The output signal at line 160 from the OR gate 150, in turn, is utilized to energize an appropriate flash lamp 91 through the flash sequencing circuit 162 in the aforementioned manner.

As is readily apparent, the linear flash array 90 is now energized at a time prior to which the flash lamp would otherwise have been energized by the output signals at lines 156 and 158 from the ripple counter 116. The sudden increase in light intensity attributable to the energization of a flash lamp 91 thereafter operates to precipitate a rapid increase in the value of the time integration of the scene light intensity. Thus, in the same manner as previously described, the output voltage signal of the light detecting and integrating circuit 94 approaches a value corresponding to the select film exposure, at which point the level detector 132 is triggered to energize the solenoid winding 76. The shutter blade elements 32 and 34 are thereafter returned to their closed positions, termination the exposure interval.

After the walking beam 54 is rotated to its full counter-clockwise position, the latch 84 may be automatically moved into intercepting relation with the edge of the walking beam so as to permit the deenergization of the solenoid as previously discussed.

As is now readily apparent, a race condition is established between the level detector 130 and the ripple counter 116, so that under extremely low levels of ambient scene light intensity, the ripple counter 116 will operate to initiate the energization of a respective flash lamp 91 at a predetermined time period subsequent to the initiation of the exposure interval. Under conditions of substantially higher ambient scene light intensity, the level detector 130 will operate to initiate the energization of a respective flash lamp 91 as a consequence of the time integration of the scene light intensity to the photoresponsive element 46 reaching a predetermined value. In this manner, the flash illumination control system may be automatically operated in both a normal flash mode of operation and in a "fill-in flash" mode of operation without regard to any external switches or buttons which would otherwise have to be actuated by the photographer. It should also be readily understood that if a respective flash lamp 91 is energized as a consequence of the level detector 130 being triggered prior to the predetermined time delay established by the ripple counter 116, then the subsequent output signal from the ripple counter 116 will operate only to switch the output signal at line 152 from the AND gate 154, but have no effect on the output signal at line 160 from the OR gate 150. The system as so far described was previously disclosed in the Application for United States patent application Ser. No. 619,384, supra.

While flash lamps are perfectly satisfactory sources of artificial illumination, it should be understood that other sources of artificial illumination such as a strobe, would also be highly desirable for use with the aforementioned exposure control system. It is toward this end that the instant invention is directed.

Electronic photographic strobe devices of the type in which the flash light produced by the flash tube of the device is automatically terminated after a predetermined quantity of light has been received from the scene being photographed by a light-responsive controlled portion of the device, are known in the art. Such strobes are commonly referred to as quench strobes. In addition to having an independent light-responsive controlled circuit in the strobe, it is also well known to utilize the exposure control circuits associated with the actual camera apparatus to control the firing and quenching of a strobe unit. The strobe fire signal may be generated in the identical manner as the previously described flash fire signal, however, whereas the ignition of an ordinary flash lamp is not quenched, additional means must be provided to quench the actual firing of a strobe. Toward this end, it is well known to couple an electronically controlled shutter camera with a quenchable electronic strobe unit so that strobe unit is quenched simultaneously with the command signal to return the shutter blade elements to their closed position.

Such an arrangement, however, would not be compatible with the exposure control system herein described, due to the photocell sweep secondary apertures 40 and 42 being configured to progressively open ahead of the primary apertures 36 and 38, so that the control circuit prematurely triggers the solenoid to energize prior to the time in which the film is fully exposed. Prematurely triggering the shutter blades to close prior to the time required for full film exposure anticipates for the additional scene light incident to the film resulting from both shutter blade over-shoot and the finite time required for the shutter blade elements to close. Thus, quenching the strobe solely as a function of the command signal to close the shutter blade elements will result in an under-exposure since the strobe is quenched instantaneously and does not provide artificial light during the time required for the opening momentum of the shutter blade elements to be overcome by the solenoid (blade overshoot) and for the shutter blade elements to be thereafter returned to their closed position, as is the case for an ordinary flash lamp.

Figure 5:
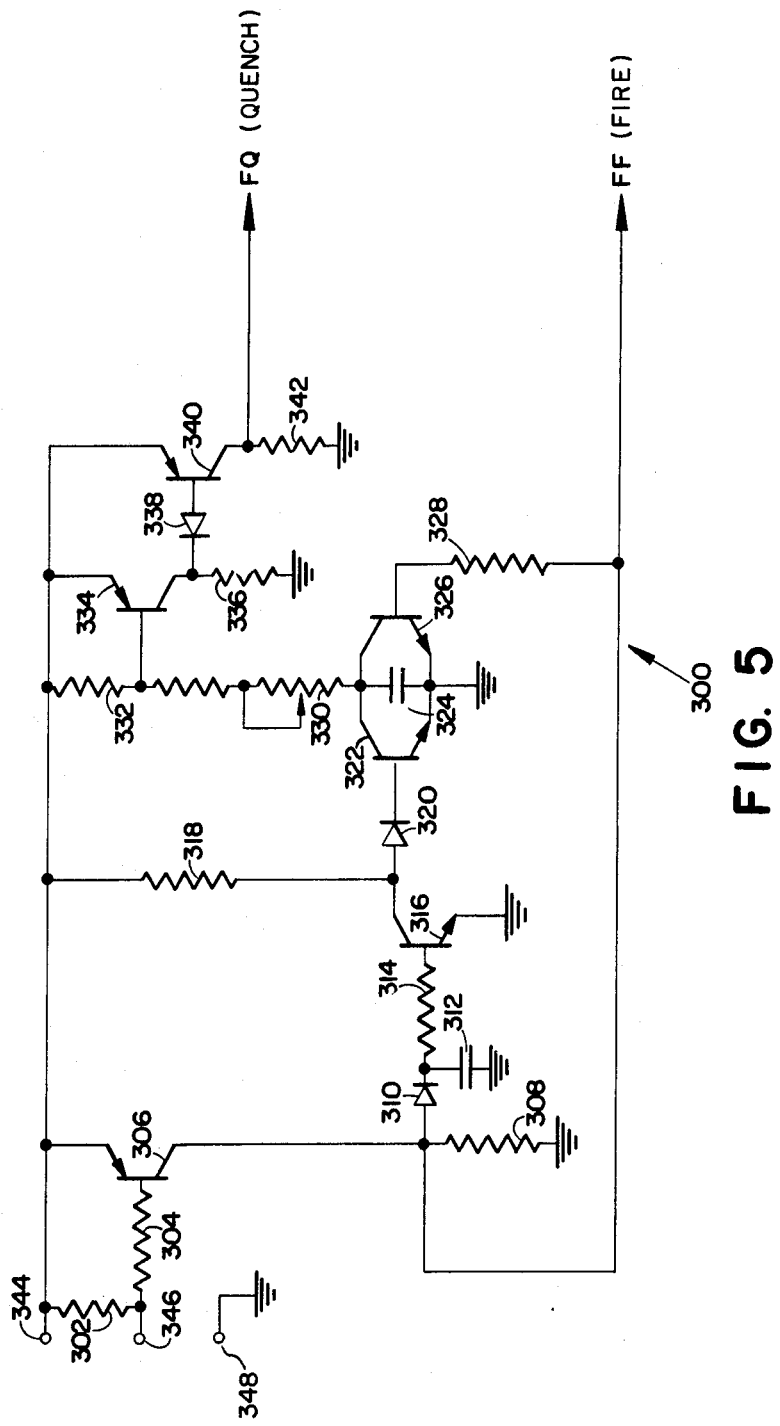
FIG. 5 is a schematic diagram showing the strobe time delay circuit of this invention.
Figures 6, 7:
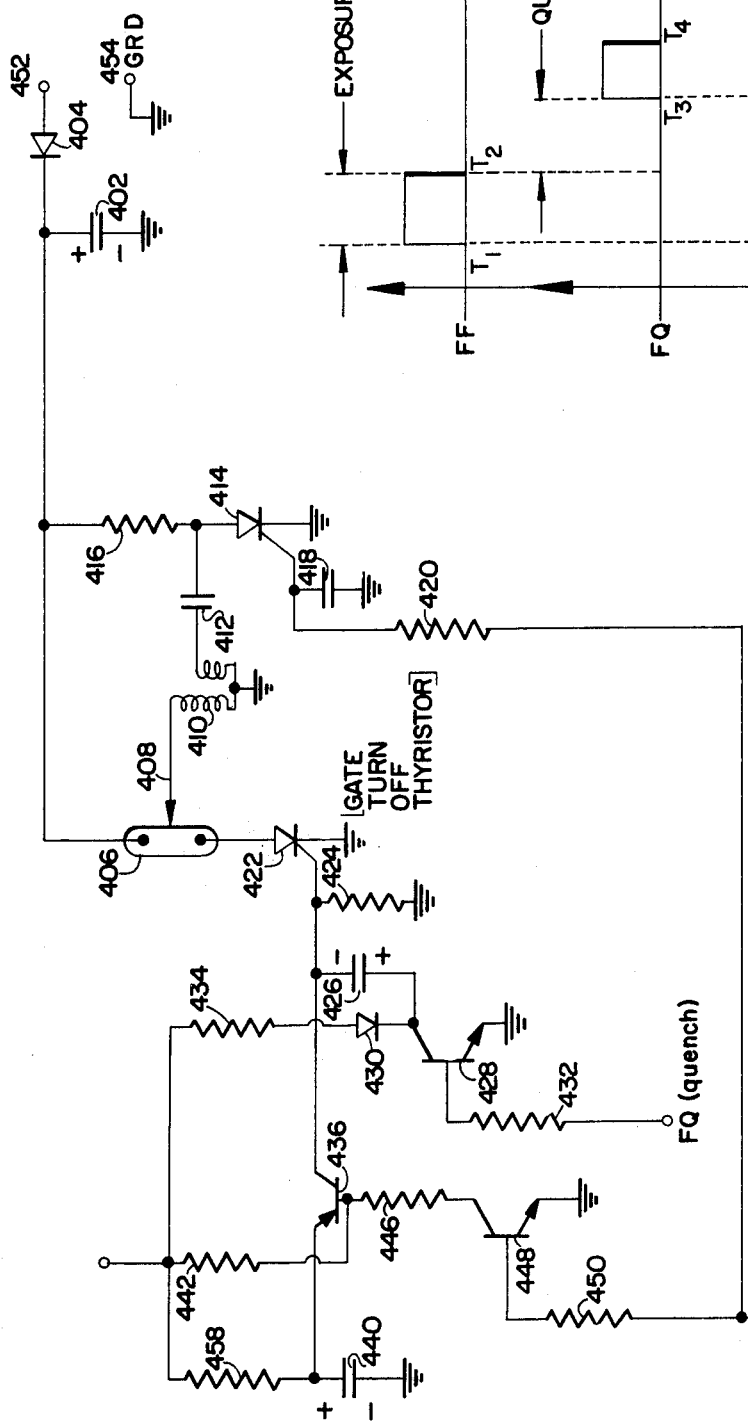
FIG. 6 is a schematic diagram showing a quench strobe circuit.
FIG. 7 is a graphical representation of the control signals provided by the strobe time delay circuit of FIG. 5.

Hence, an additional time delay circuit 300, as shown in FIG. 5, must be utilized in conjunction with a quench strobe 400, as shown in FIG. 6, so that both the quench strobe 400 and linear flash array 90 can be used interchangeably with the socket 86. Referring now to FIG. 5, there is shown the schematic diagram of the strobe time delay circuit 300 having input terminals 344 and 346 adapted for respective connection with terminal elements 88' and 88 from flash sequencing circuit 162. Across the input terminals 344 and 346, there is provided a resistor 302 having an impedance characteristic corresponding with the predetermined characteristic of one of the flash lamps 91. Resistor 302 is provided for reasons fully explained in U.S. Pat. No. 3,858,227 entitled "Adapter Apparatus for Flash Firing System" by Seymour Ellin, et al., issued Dec. 31, 1974.

Input terminal 346 connects to the base terminal of a PNP transistor 306 by way of an interconnecting resistor 304. The collector terminal transistor 306, in turn, connects to both the anode terminal of a diode 310 and to a resistor 308, the other side of which is grounded. The cathode terminal of diode 310, in turn, connects to one side of a timing capacitor 312, the other side of which is grounded. The cathode terminal of diode 310 also connects to the base of an NPN transistor 316 by way of an interconnecting resistor 314. Transistor 316 is connected in a grounded emitter mode with the collector terminal connected to the input terminal 344 by way of an interconnecting resistor 318. The collector terminal of transistor 316 additionally connects to the anode terminal of a diode 320, the cathode terminal of which connects directly to the base of an NPN transistor 322. The emitter terminal of transistor 322 is connected in common grounded emitter mode with the emitter terminal of another NPN transistor 326. Another timing capacitor 324 is provided in connection across the collector-emitter terminals of transistors 322 and 326. The base terminal of transistor 326 connects to the collector terminal of transistor 306 by way of an interconnecting resistor 328. The collector terminals of transistors 322 and 326 connect to the base of a PNP transistor 334 by way of a variable potentiometer 330. The emitter terminal of transistor 334 connects directly to the input terminal 344 while the base terminal of transistor 334 connects to the input terminal 344 by way of an interconnecting resistor 332. The collector terminal of transistor 334, in turn, is grounded by way of an interconnecting resistor 336, and additionally connects to the cathode terminal of a diode 338. The anode terminal of diode 338, in turn, connects to the base of a PNP transistor 340, the collector terminal of which connects directly to the flash quench output terminal shown at FQ. The emitter terminal of transistor 340 is in common connection with the emitter terminal of transistor 334 so as to connect directly to the input terminal 344. The flash fire signal is derived from the output terminal shown at FF which connects directly to the collector of transistor 306.

Referring now to FIG. 6, there is shown a schematic diagram for the quench strobe 400 circuit may be utilized in conjunction with the strobe time delay circuit 300 of FIG. 5. It should be readily understood that the quench strobe circuit 400 is representative of only one of a broad variety of quench strobe circuits which may be utilized in conjunction with the time delay circuit 300 and which are well known in the art. Other such strobe circuits may be quenched by short circuiting the flash circuit through ignition of a quench tube. The flash fire terminal FF connects to the base terminal of an NPN transistor 448 by way of an interconnecting resistor 450. The emitter terminal of transistor 448 is grounded while the collector terminal connects to the base terminal of a PNP transistor 436 by way of an interconnecting resistor 446. The base terminal of transistor 436 additionally connects, by way of an interconnecting resistor 442, to a voltage supply Vs which may be associated with the strobe unit in a well-known manner. The emitter terminal of transistor 436 is connected to ground by way of a capacitor 440 and also connects to the positive voltage supply Vs by way of an interconnecting resistor 458. The collector terminal of transistor 436, in turn, connects to the gate electrode of a thyristor 422.

The flash fire input terminal FF additionally connects to the gate electrode of a silicon controlled rectifier SCR 414 by way of an interconnecting resistor 420. The gate electrode of SCR 414 is additionally grounded by way of a capacitor 418. The anode terminal of SCR 414, in turn, connects to a storage capacitor 402 by way of an interconnecting resistor 416. Between the storage capacitor 402 and thyristor 422, there is interconnected a flash or light producing tube 406. A light triggering terminal 408 of the flash tube 406 is coupled through a transformer 410 to one terminal of a capacitor 412. The other terminal of the capacitor 412 is connected to the anode terminal of the SCR 414. Terminals 452 and 454 are provided for connection to the usual capacitor charging means which is not shown in FIG. 6. Such capacitor charging means are well known in the art, and it is sufficient to say that the capacitor 402 is only maintained in a charged state by the aforementioned capacitor charging means whereby a relatively high voltage is maintained across the capacitor 402. Terminal 452 connects to the anode terminal of a diode 404 with the cathode terminal thereof connecting directly to the capacitor 402.

Referring now to the flash quench input terminal FQ, it can be seen to connect to the base of a PNP transistor 428 by way of an interconnecting resistor 432. Transistor 428 is connected in a grounded emitter mode, while the collector terminal thereof connects directly to both the cathode terminal of a diode 430 and to one terminal of a capacitor 426. The anode terminal of diode 430, in turn, is connected to the positive voltage supply Vs by way of an interconnecting resistor 434. The other terminal of capacitor 426 connects to the gate electrode of thyristor 422.

Under conditions where the ambient scene ligh intensity is insufficient to provide an adequate film exposure, the quench strobe 400 may be used in place of the linear flash array 90 to provide artificial scene illumination. Insertion of the terminals 344 and 346 within the flash array receiving socket 86 may also operate to actuate the follow focus mechanism 150 so as to move the interceptor pin 146 into the walking beam 54 locus of travel as previously discussed. Preferably, terminal elements 344 and 346 from the strobe time delay circuit 300 are brought into respective electrical contact with the terminal elements 88' and 88 from the flash sequencing curcuit 162. In addition, the ground terminal element 348 is brought into electrical contact with terminal element 88'' from the flash sequencing circuit 162. Whereas terminal element 346 may ideally connect to either one or all of the terminal elements 88 from the flash sequencing circuit 162, it is preferred that terminal element 346 electrically connect to the last terminal element 88 from transistor 216 for reasons which are too complex to be further discussed herein, but which are readily apparent from U.S. Pat. No. 3,558,227 supra.

Subsequent to the insertion of the terminal elements 344, 346 and 348 from the strobe time delay circuit 300 into the flash array receiving socket 86, a low ambient light intensity photographic exposure interval may be commenced upon the depression of the photographic exposure interval initiating button $S_1$. Closure of switch $S_1$ operates to simultaneously move the latch 84 out of engagement with the edge of the walking beam 54 as well as to energize the exposure control circuitry of FIG. 3 in the above described manner. Thus, the shutter blade elements 32 and 34 are permitted to move in directions which operate to progressively enlarge the effective aperture over the light entering exposure opening 16. Rotation of the walking beam 54 effects a simultaneous linear and angular displacement of the shutter blade elements 32 and 34 about pivot 48 so that photocell sweep secondary apertures 40 and 42 simultaneously define a corresponding progressively enlarging aperture opening over the photoresponsive element 46.

The photoresponsive element 46 again provides an appropriate voltage response corresponding to the scene light intensity incident thereon, which voltage response is thereafter integrated by the operational amplifier 96 and feedback capacitor 102 to provide an output signal representative of the time integration of the scene light intensity incident to the photoresponsive element 46. As is now readily apparent, the low ambient light intensity remains substantially constant during the time required for the shutter blade elements to reach their follow focus setting and for a predetermined period thereafter at which time the ripple counter 116 provides positive output signals at lines 156 and 158 to switch the AND gate 154 and provide a positive output signal at line 152 to the OR gate 150. The OR gate 150, in turn, switches to provide a positive flash igniting signal to the flash sequencing circuit 162 by way of interconnecting line 160. Referring now to FIG. 5, it can be seen that the resistor 302, having an impedance characteristic corresponding with the predetermined impedance characteristic of an unfired flash lamp, is effectively connected between the terminal element 88' and the terminal element 88 from the collector of transistor 216. Thus, a high input signal level at line 160 will operate to turn on transistor 216 in a manner as previously described.

Referring now to the strobe time delay circuit 300 of FIG. 5, it can be seen to assume the following condition immediately prior to the turning on of transistor 216. Immediately prior to transistor 216 being turned on, transistor 306 is in a nonconductive state, in turn, causing transistors 316 and 326 to assume similar nonconductive states. With transistor 316 being off, transistor 322 assumes a conductive state so as to effectively short out capacitor 324 while also turning on transistor 334. With transistor 334 conducting, transistor 340 assumes a nonconductive state to provide a substantially zero output signal level at the flash quench terminal FQ. In like manner, with transistor 306 off, a substantially zero output signal level is also provided at the flash fire terminals FF.

With the turning on of transistor 216 from the flash sequencing circuit 162, transistor 306 of the strobe time delay circuit 300 also turns on at time $T_1$ so as to provide a positive flash fire signal level at the flash fire terminals FF as shown graphically in FIG. 7. Turning on transistor 306 also results in transistor 316 turning on with transistor 322 being turned off. Capacitor 324, however, remains effectively short circuited by transistor 326 which is turned on simultaneously with transistor 306. Thus, the output signal at the flash quence terminals FQ remains unaffected by the turning on of transistor 306.

Referring now to the quench strobe diagram of FIG. 6, it can be seen that a positive flash fire signal operates to turn on transistor 448 while also turning on transistor 436. Thus, a current will flow from capacitor 440 through the emitter collector junction of transistor 436 to the gate electrode of thyristor 422 thereby rendering it conductive. When the SCR 414 becomes conductive, a a lower resistance discharge path is presented across the capacitor 412 which causes the capacitor to dump its charge so as to trigger the flash tube 406. As the flash tube 406 begins to conduct, the voltage on the high voltage terminal 452 may be reduced as the charge on the capacitor 402 is dumped through the flash tube 406.

Subsequent to the firing of flash tube 406, there is again incurred a rapid rise in the time integration of the scene light intensity incident to the photoresponsive element 46. As previously discussed, the steady state input voltage reference level to the detector circuit 132 is biased by the resistors 138 and 140 to establish the predetermined value to which the input signal at line 126 and 128 must increase in order to trigger the level detector 132. Thus, the light intensity is integrated until reaching the predetermined value at which point the level detector circuit 132 is triggered into an abrupt change of state at the output line 142, from a generally low signal value which is insufficient to maintain the transistors 144 and 145 in conduction, to a substantially higher current level of sufficient value to turn on the transistors 144 and 145. Turning on the transistor 144, in turn, operates to energize the solenoid winding 76 to retract the plunger unit 74 so as to rotate the walking beam 54 in a counter-clockwise direction, as viewed from FIG. 2, against the biasing force of tension spring 80, thereby moving the shutter blade elements into their light blocking closed position. After the walking beam 54 is rotated to its full counter-clockwise position, the latch 84 may be automatically moved into intercepting relation with the edge of the walking beam so as to permit the deenergization of solenoid in the above described manner.

Turning on transistor 145 operates to effectively ground the input signal at line 160 to the flash sequencing circuit 162. Effectively grounding the input signal at line 160, in turn, operates to turn transistor 216 off thereby turning transistor 306 of the strobe time delay circuit 300 off so as to remove the flash fire signal at time $T_2$ as shown in the graph of FIG. 7. Turning transistor 306 off also operates to turn transistor 326 off so as to allow capacitor 324 to start to charge. Transistor 322 remains off to permit capacitor 324 to charge by virtue of the capacitor 312 which discharges through resistor 314 and the base-emitter junction of transmitter 316 so as to maintain transistor 316 turned on thereby keeping transistor 322 off. As is readily apparent, diode 310 prevents capacitor 312 from discharging through resistor 308. Thus, capacitor 324 is charged through resistor 332 and potentiometer 330 until reaching the threshold voltage required to turn off transistor 334 and thereby turn on transistor 340. Turning on transistor 340 provides the flash quench signal a time $T_3$ as shown graphically in FIG. 7. As is now readily apparent, the flash quench signal appears at a time $T_3$ subsequent to the termination of the flash fire signal at $T_2$ which time also corresponds to the command signal from the level detector 132 for energizing the solenoid winding 76 to close the shutter blade elements. The time delay from $T_2$ to $T_3$ is determined by the RC time constant of the capacitor 324 and the resistor 332 in series with the potentiometer 330. Thus, the user may vary the time delay from $T_2$ to $T_3$ by adjusting the potentiometer 330. As is now readily apparent, the flash quench signal is also of limited duration as a result of the time required for capacitor 312 to discharge through the resistor 314 and the base-emitter junction of transistor 316. Thus, once capacitor 312 is discharged, transistor 316 turns off thereby turning on transistor 322 so as to effectively short capacitor 324. With capacitor 324 once again effectively shorted, transistor 334 turns on so as to turn off transistor 340 and return the output signal at the flash quench terminals back to a low value, as shown at $T_4$ in FIG. 7.

Referring now to the strobe circuit 400 of FIG. 6, it can be seen that the appearance of the flash fire signal operated to turn on transistor 448 thereby also turning on transistor 436 so as to cause a current flow through the emitter collector junction thereof into the gate electrode of thyristor 422 thereby rendering it conductive. At the same time, the flash fire signal was also applied, by way of resistor 420, to the gate electrode of SCR 414 thereby rendering it conductive. When the SCR 414 becomes conductive, a low resistance discharge path is presented for the capacitor 412 which causes the capacitor 412 to dump its charge. That action induces a triggering signal to appear at the flash tube triggering terminal 408 thereby initiating conduction in the flash tube 406. Thus the flash tube is fired at $T_1$ in correspondence with the leading edge of the flash fire signal as shown in the diagram of FIG. 7, as previously discussed. It should be readily appreciated that capacitor 426 is charged by way of resistor 434 and diode 430 with the positive terminal of the capacitor 426 connecting directly to the cathode of diode 430 and the collector of transistor 428. The subsequent appearance of the flash quench signal at time $T_3$ after the predetermined time delay, operates to turn on transistor 428 thereby effectively grounding the positive terminal side of the capacitor or 426. With the positive terminal side of capacitor 426 grounded, the negative terminal side then drops to a voltage level below ground which negative voltage is applied directly to the gate electrode of thyristor 422 so as to render thyristor 422 nonconductive and thereby quench flash tube 406.

Thus it can be seen that the flash tube 406 is quenched subsequent to the expiration of a predetermined time period after the triggering of level detector 132 and the energization of the solenoid winding 72 to retract the shutter blade elements to their closed position. The predetermined time delay is selected so that the additional scene light admitted from the quench strobe subsequent to the triggering of detector 132 closely approximates the additional scene light which would otherwise be admitted by an ordinary flash lamp. In this manner, the aforementioned anticipation characteristic of the photocell secondary apertures 40 and 42 which accommodates for the additional scene light admitted through the primary apertures 36 and 38 during the time required for the shutter blade elements to move to their closed position, is effectively correlated to the predetermined time delay to accommodate for the quench strobe which artificial light output may be substantially instantaneously terminated.

The predetermined time delay also, by insuring that at least a portion of the scene light from the strobe is admitted during the finite shutter blade closing time effectively compensates for variations in background scene brightness in the manner of an ordinary flash lamp. Thus, with a brighter than average scene background, the shutter blade elements are triggered to close early on the rising portion of the flash curve so that more scene light is admitted during the finite blade closing time thereby better exposing a subject's face against the bright background. Conversely, with a darker than average scene background, the shutter blade elements are triggered to close later on the falling portion of the flash curve so that less scene light is admitted during the finite blade closing time thereby better exposing a subject's face against the dark background.

The photographic apparatus is also capable of operating in the aforementioned "fill-in flash" mode of operation to provide supplementary illumination in situations where the ambient scene light intensity levels are relatively high. Thus the "fill-in flash" mode of operation is commenced in the previously described manner upon the depression of the photographic exposure interval initiating button $S_1$ which operates to release the locking beam 54 and to energize the control circuit of FIG. 3 in the aforementioned manner. The shutter blade elements 32 and 34 are moved by the tension spring 80 toward their maximum aperture defining position as limited by the follow focus interceptor pin 176. As a result of the increasing ambient light intensity, the time integration of the scene light intensity incident to the photoresponsive element 46 proceeds substantially more rapidly than that for the previously discussed lower ambient scene light intensity situation. Thus the output voltage signal from the light detecting and integrating circuit 94 at line 126 will operate to cause the level detector 130 to trigger and thereby change the output signal therefrom at line 148 from a generally low value to a substantially higher current level of sufficient value to switch the OR gate 150. The output signal at line 160 from the OR gate 150, in turn, operates to flash the flash tube 406 through the flash sequencing circuit 162 in the strobe time delay circuit 300 as previously discussed. Subsequent triggering of the level detector 132 as a result of the increased scene light from the flash tube 406 will thereafter operate to quench the strobe in the aforementioned manner.

Since certain changes may be made in the above described system and apparatus without the departing from the scope of the invention herein involved, it is intended that all matter contained, this scription thereof, or shown in the accompanying drawings shall be interpreted as illustrated and not in a limiting sense.

It should be readily understood that although the time delay circuit 300 has been shown and described as having terminal elements insertable within the flash array receiving socket 86, it may alternatively be provided as either an integral part of the camera control circuit or the strobe circuitry. In addition, a unitary camera apparatus may be provided with both an integral strobe unit and an integral time delay circuit as shown in FIG. 5. In addition, the time delay circuit may exist independently of either the camera or strobe.

What is claimed is:

1. A photographic camera apparatus comprising:
   a housing;
   means for mounting an objective lens on said housing;
   means associated with said housing for receiving a source of electrical energy;
   a source of artificial illumination;
   means within said housing for defining a film exposure plane;
   a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;
   scene light detecting means energizable by the source of electrical energy for providing an output signal in correspondence to the amount of scene light detected subsequent to the commencement of an exposure interval;
   means, at least in part, energizable by the source of electrical energy, for initiating the displacement of said blade assembly from its said initial closed arrangement towards its said second arrangement thereby commencing said exposure interval and for initiating the energization of the source of artificial illumination to effect the firing thereof subsequent to the initiating of the exposure interval, and then responsive to said output signal of said scene light detecting means reaching a first predetermined value, for effecting the displacement of said blade assembly into its said final closed arrangement; and
   circuit means energizable by the source of electrical energy and responsive to said output signal of said scene light detecting means reaching its said first predetermined value of initiating the deenergization of the source of artificial illumination to effect the termination of the firing thereof, said circuit means including a first timing capacitor, first switch means for establishing a first effective electrical short across said timing capacitor prior to the initiation of the energization of the source of artificial illumination and responsive to the initiation of the energization of the source of artificial illumination for removing said first electrical short across said timing capacitor, second switch means for establishing a second effective electrical short across said timing capacitor substantially simultaneously with the removal of said first electrical short and responsive to said output signal of said scene light detecting means reaching said first predetermined value for removing said second effective electrical short across said timing capacitor so as to permit said timing capacitor to commence charging and means responsive to the charge on said timing capacitor reaching a predetermined value for initiating the deenergization of the source of artificial illumination whereby the deenergization of the source of artificial illumination occurs a predetermined time period after said output signal of said scene light detecting means reaches its said first predetermined value.

2. The camera of claim 1 wherein said first switching means responds to the initiation of the energization of the source of artificial illumination to remove said first effective electrical short for only a predetermined time period of sufficient duration for said output signal from said scene light detecting means to reach said first predetermined value and for said predetermined time delay to expire.

3. The camera of claim 2 wherein said first switching means includes a second timing capacitor for determining said predetermined time period during which said first effective electrical short is removed from said first timing capacitor.

4. The photographic camera of claim 1 wherein said blade assembly includes two shutter blade elements having respective primary and secondary apertures therethrough wherein the primary apertures during shutter blade displacement cooperatively define a first effective aperture for admitting scene light to said exposure plane and wherein the secondary apertures move in correspondence with the primary apertures and cooperatively define a second effective aperture for admitting scene light to said scene light detecting means, said second effective aperture having an anticipation characteristic with respect to said first effective aperture to which said predetermined time delay is correlated in order to effect the termination of the firing of the source of artificial illumination when the correct exposure value is achieved.

5. The photographic camera of claim 1 wherein the source of artificial illumination is the electronic flash tube of a strobe.

6. A photographic camera for use with lighting apparatus of the type having a source of artificial illumination, said camera comprising:
a housing;
means for mounting an objective lens on said housing;
means associated with said housing for receiving a source of electrical energy;
means for effecting an electrical connection to the lighting apparatus;
means within said housing for defining a film exposure plane;
a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;
scene light detecting means energizable by the source of electrical energy for providing an output signal in correspondence to the amount of scene light detected subsequent to the commencement of an exposure interval;
means, at least in part, energizable by the source of electrical energy for initiating the displacement of said blade assembly from its said initial closed arrangement towards its said second arrangement thereby commencing said exposure interval and for providing a first select signal operative when said camera is electrically connected to the lighting apparatus to initiate the energization of the source of artificial illumination to effect the firing thereof subsequent to the initiation of the exposure interval and then responsive to said output signal of said scene light detecting means reaching a first predetermined value for effecting the displacement of said blade assembly into its said final closed arrangement; and
circuit means energizable by the source of electrical energy and responsive to said output signal of said scene light detecting means reaching its said first predetermined value for initiating the deenergization of the source of artificial illumination to effect the termination of the firing thereof, said circuit means including a first timing capacitor, first switch means for establishing a first effective electrical short across said timing capacitor prior to said output signal of said scene light detecting means reaching its said first predetermined value and responsive to said output signal of said scene light detecting means reaching its said first predetermined value for removing said first electrical short across said timing capacitor, second switch means for establishing a second effective electrical short across said timing capacitor substantially simultaneously with the removal of said first electrical short and responsive to said output signal of said scene light detecting means reaching its said first predetermined value for removing said second effective electrical short across said timing capacitor so as to permit said timing capacitor to commence charging, and means responsive to the charge on said timing capacitor reaching a predetermined value for providing a second select signal operative when said camera is electrically connected to the lighting apparatus to initiate the deenergization of the source of artificial illumination, whereby the deenergization of the source of artificial illumination is commenced a predetermined time period following said output signal of said detector means reaching its said first predetermined value.

7. The camera of claim 6 wherein said first switching means responds to the said first signal to remove said first effective electrical short for only a predetermined time period of sufficient duration for said output signal from said scene light detecting means to reach said first predetermined value and for said predetermined time delay to expire.

8. The camera of claim 6 wherein said first switching means includes a second timing capacitor for determining said predetermined time period during which said first effective electrical short is removed from said first timing capacitor.

9. The photographic camera of claim 6 wherein said blade assembly includes two shutter blade elements having respective primary and secondary apertures therethrough wherein the primary apertures during shutter blade displacement cooperatively define a first effective aperture for admitting scene light to said exposure plane and wherein the secondary apertures move in correspondence with the primary apertures and cooperatively define a second effective aperture for admitting scene light to said scene light detecting means, said second effective aperture having an anticipation characteristic with respect to said first effective aperture to which said predetermined time delay is correlated in order to effect the termination of the firing of the source of artificial illumination when the correct exposure value is achieved.

10. Lighting apparatus for use with a photographic camera of the type having means for providing at least two control signals in sequence during the course of a photographic interval, said lighting apparatus comprising:
a source of artificial illumination;
means for effecting an electrical connection to the camera in order to receive the two control signals from the camera; and
circuit means energizable by a source of electrical energy and responsive to the first of the two signals from the camera for initiating the energization of said source of artificial illumination to effect the firing thereof, and then responsive to the second of the two signals from the camera for initiating the deenergization of the source of artificial illumination subsequent to the expiration of a predetermined time delay after receipt of the second of the two signals from the camera, said circuit means including: a first timing capacitor, first switch means for establishing a first effective electrical short across said timing capacitor prior to the receipt of the first of the two signals from the camera, and responsive to the first of the two signals from the camera for removing said first electrical short across said timing capacitor, second switch means for establishing a second effective electrical short across said timing capacitor substantially simultaneously with the removal of said first electrical short and responsive to the second of the two signals from the camera for removing said second effective electrical short across said timing capacitor so as to permit said timing capacitor to commence charging, and means responsive to the charge on said timing capacitor reaching a predetermined value for initiating the deenergization of the source of artificial illumination.

11. The lighting apparatus of claim 10 wherein said first switching means responds to the first of the two signals from the camera to remove said first effective electrical short for only a predetermined time period of sufficient duration for the second of the two signals from the camera to appear and for said predetermined time delay to expire.

12. The camera of claim 11 wherein said first switching means includes a second timing capacitor for determining said predetermined time period during which siad first effective electrical short is removed from said first timing capacitor.

13. The lighting apparatus of claim 10 wherein; the camera includes: a housing; means for mounting an objective lens on the housing; means within the housing for receiving a source of electrical energy; a source of artificial illumination; means within the housing for defining a film exposure plane; a blade assembly mounted and arranged within the housing for displacement from an initial closed arrangement wherein the blade assembly precludes scene light from impinging on the exposure plane to a second arrangement wherein the blade assembly defines a maximum aperture through which scene light is permitted to impinge on the exposure plane and then to a final closed arrangement wherein the blade assembly again precludes scene light from impinging on the exposure plane, such a displacement of the blade assembly serving to define an exposure interval during which scene light is incident upon the film exposure plane wherein the blade assembly includes two shutter blade elements having respective primary and secondary apertures therethrough wherein the primary apertures, during shutter blade displacement, cooperatively define a first effective aperture for admitting scene light to the exposure plane and wherein the secondary apertures move in correspondence with the primary apertures and cooperatively define a second effective aperture having an anticipation characteristic with respect to the first effective aperture; and scene light detecting means energizable by the source of electrical energy for providing an output signal in correspondence to the amount of scene light detected through the second effective aperture subsequent to the commencement of an exposure interval; and wherein:

said predetermined time delay is correlated to the anticipation characteristic in order to effect the termination of the firing of the source of artificial illumination when the correct exposure value is achieved.

14. The lighting apparatus of claim 10 wherein the source of artificial illumination is the electronic flash tube of a strobe.

15. A time delay circuit responsive to two sequential control signals for providing a select signal, said time delay circuit comprising:

means for effecting an electrical connection in order to receive the two control signals; and circuit means energizable by a source of electrical energy, and responsive to the second of the two control signals for providing said select signal subsequent to the expiration of a predetermined time delay after receipt of the second of the two control signals, said circuit means including: a first timing capacitor, first switch means for establishing a first effective electrical short across said timing capacitor prior to the first of the two control signals, and responsive to the first of the two control signals for removing said first electrical short across said timing capacitor, second switch means for establishing a second effective electrical short across said timing capacitor substantially simultaneous with the removal of said first electrical short and responsive to the second of the two control signals for removing said second effective electrical short across said timing capacitor so as to permit said timing capacitor to charge, and means responsive to the charge on said timing capacitor reaching a predetermined value at the expiration of said predetermined time delay for providing said select signal.

16. The time delay circuit of claim 15 wherein said first switching means responds to the first of the two signals to remove said first effective electrical short for only a predetermined time period of sufficient duration for the second of the two signals to appear and for said predetermined time delay to expire.

17. The time delay circuit of claim 16 wherein said first switching means includes a second timing capacitor for determining said predetermined time period during which said first effective electrical short is removed from said first timing capacitor.

* * * * *